US008254577B2

(12) United States Patent
Almoustafa et al.

(10) Patent No.: US 8,254,577 B2
(45) Date of Patent: Aug. 28, 2012

(54) VALIDATION OF ENCRYPTION KEY (75) Inventors: Ahmed M. Almoustafa, Tucson, AZ (US); Brian Gerard Goodman, Tucson, AZ (US); Paul Merrill Greco, Tucson, AZ (US); Glen Alan Jaquette, Tucson, AZ (US); Leonard George Jesionowski, Tucson, AZ (US); Aaron S. Palazzolo, Tucson, AZ (US); Michael L. Taylor, Tucson, AZ (US); An Thien Tran, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1151 days.

(21) Appl. No.: 12/034,604

(22) Filed: Feb. 20, 2008

(65) Prior Publication Data

US 2009/0208017 A1 Aug. 20, 2009

(51) Int. Cl.
H04L 29/06 (2006.01)
H04L 9/00 (2006.01)
H04L 9/08 (2006.01)
G06F 21/00 (2006.01)
G06F 11/30 (2006.01)
G06F 17/30 (2006.01)
G06F 7/04 (2006.01)

(52) U.S. Cl. ........ 380/277; 713/165; 713/182; 713/183; 713/189; 713/193; 726/2; 726/3; 726/7; 380/278

(58) Field of Classification Search .................. 380/277, 380/278, 279, 280, 281, 282, 286; 709/206; 713/189, 193
See application file for complete search history.

(56) References Cited

U.S. PATENT DOCUMENTS

| 5,621,795 | A * | 4/1997 | Baker et al. ..................... 380/277 |
| 7,475,139 | B2 * | 1/2009 | Goodman et al. ............ 709/225 |
| 7,539,311 | B2 * | 5/2009 | Weis .............................. 380/277 |
| 7,673,333 | B2 * | 3/2010 | Hamid et al. ..................... 726/9 |
| 7,869,603 | B2 * | 1/2011 | Goodman et al. ............ 380/277 |
| 7,869,604 | B2 * | 1/2011 | Goodman et al. ............ 380/277 |
| 7,877,603 | B2 * | 1/2011 | Goodman et al. ............ 713/165 |
| 7,953,978 | B2 * | 5/2011 | Greco et al. ..................... 713/171 |
| 2001/0019614 | A1 * | 9/2001 | Madoukh ....................... 380/277 |
| 2002/0067832 | A1 * | 6/2002 | Jablon .......................... 380/277 |
| 2003/0021417 | A1 * | 1/2003 | Vasic et al. ..................... 380/277 |
| 2003/0048909 | A1 * | 3/2003 | MacKenzie et al. .......... 380/278 |
| 2006/0149962 | A1 * | 7/2006 | Fountain et al. .............. 713/151 |
| 2007/0127722 | A1 * | 6/2007 | Lam et al. ..................... 380/277 |
| 2007/0217611 | A1 * | 9/2007 | Weis .............................. 380/277 |
| 2007/0289003 | A1 * | 12/2007 | Hamid et al. ..................... 726/9 |
| 2008/0152143 | A1 * | 6/2008 | Estelle et al. .................. 380/277 |
| 2008/0219449 | A1 * | 9/2008 | Ball et al. ....................... 380/277 |
| 2008/0307054 | A1 * | 12/2008 | Kamarthy et al. ............ 709/206 |

* cited by examiner

*Primary Examiner* — Saleh Najjar
*Assistant Examiner* — Tae Kim
(74) *Attorney, Agent, or Firm* — Rabindranath Dutta; Konrad Raynes & Victor LLP (57) ABSTRACT

A label corresponding to a cryptographic key is stored at a first computational device. A user provided label is received at a second computational device. The user provided label is sent from the second computational device to the first computational device. The user provided label is compared to the label stored at the first computational device. The cryptographic key is used to perform cryptographic operations on data, in response to determining that the user provided label matches the label stored at the first computational device.

20 Claims, 4 Drawing Sheets

VALIDATION OF ENCRYPTION KEY

BACKGROUND

1. Field

The disclosure relates to a method, system, and article of manufacture for the validation of an encryption key.

2. Background

Many customers need data encryption to ensure security for data. Certain customers may need an assurance that data would be unreadable should the data ever be lost or stolen. There are several different encryption mechanisms that can be implemented to generate encrypted data. For example, various hardware and software based cryptographic mechanisms may be used for encrypting and decrypting electronic data.

In symmetric key cryptography, a cryptographic key may be used in association with an encryption algorithm to encrypt data, such that the encrypted data cannot be read without decrypting the encrypting data. In symmetric key cryptography the cryptographic key that is used for encrypting the data is used for decrypting the encrypted data via a decrypting algorithm. In contrast to symmetric key cryptography, public-key cryptography uses two cryptographic keys—a public key to encrypt messages and a private key to decrypt the messages. Symmetric key cryptography may also be referred to as secret key cryptography and symmetrically encrypted data is data that has been encrypted with a symmetric cryptographic key.

SUMMARY OF THE PREFERRED EMBODIMENTS

Provided are a method, system, and article of manufacture in which a label corresponding to a cryptographic key is stored at a first computational device. A user provided label is received at a second computational device. The user provided label is sent from the second computational device to the first computational device. The user provided label is compared to the label stored at the first computational. The cryptographic key is used to perform cryptographic operations on data, in response to determining that the user provided label matches the label stored at the first computational device.

In certain embodiments, the first computational device is a primary cryptographic key manager server, wherein the second computational device is a storage controller coupled to a storage device that stores the data. A ping command is sent from the storage controller to the cryptographic key manager server, in response to receiving the user provided label at the storage controller. The storage controller generates a message for the user indicating that the primary cryptographic key manager is unavailable, in response to receiving no response to the ping command from the cryptographic key manager server.

In certain additional embodiments, another ping command is sent to an alternate cryptographic key manager server in response to receiving no response to the ping command from the primary cryptographic key manager server, wherein the alternate cryptographic key manager server is capable of functioning as a replacement for the primary cryptographic key manager server. The alternate cryptographic key manager server is used to compare the user provided label to a label stored at the alternate cryptographic key manager server, in response to receiving a response to the another ping command from the alternate cryptographic key manager server. A cryptographic key corresponding to the label stored at the alternate cryptographic key manager server is used to perform cryptographic operations on the data.

In further embodiments, the second computational device generates a message for the user indicating that the user provided label is invalid or that the user provided label does not exist on the first computational device, in response to determining that the user provided label does not match the label stored at the first computational device.

In yet further embodiments, the first computational device is a cryptographic key manager server, wherein the second computational device is a storage controller coupled to a storage device that stores the data, wherein a plurality of storage controllers are coupled to a plurality of cryptographic key manager servers over a network, wherein each of the plurality of cryptographic key manager servers can replace one another, wherein each cryptographic key manager server includes a plurality of cryptographic keys and a plurality of labels corresponding to the plurality of cryptographic keys, and wherein for each cryptographic key there is a corresponding label.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Currently available encryption products may not be able to verify whether the setup of the encryption product is correct until user initiated Input/Output (I/O) or jobs are started. Once the user initiated I/O or jobs are started, a failure of customer activities may occur. Manual intervention and manual checks may be needed to make sure everything is setup correctly in currently existing encryption products.

Certain embodiments provide the ability of not only testing the connectively of an encryption device to a cryptographic key manager server but also allows an encryption device to query the cryptographic key manager server and make sure valid cryptographic key labels exist on both the cryptographic key manager server and the encryption device. In case the cryptographic key labels are invalid then corrective actions can be taken before user initiated I/O or jobs are started, wherein the used initiated I/O or jobs may use a cryptographic key corresponding to the cryptographic key labels.

Exemplary Embodiments

Figure 1:
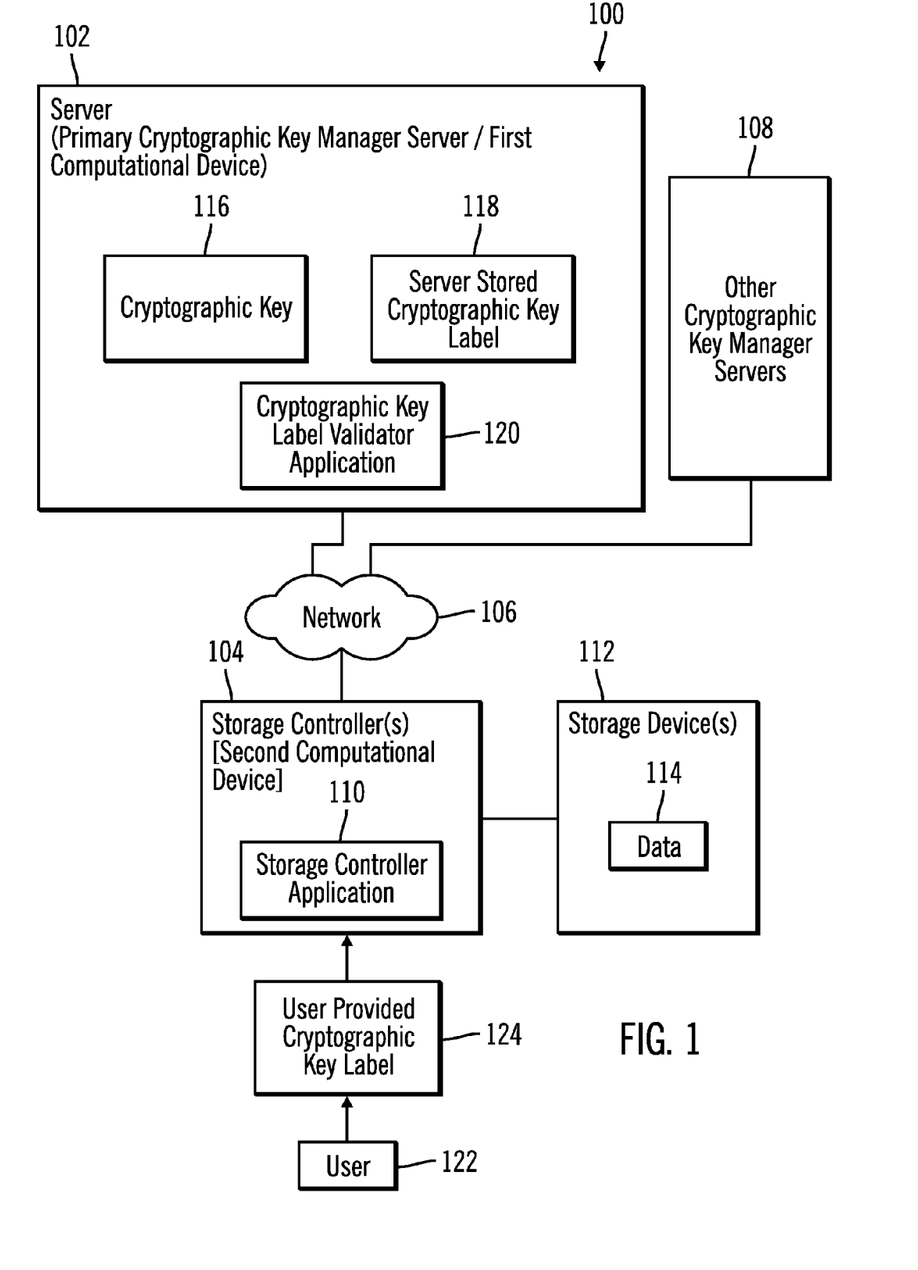
FIG. 1 illustrates a block diagram of a computing environment, in which at least one cryptographic key manager server is coupled to one or more storage controllers, in accordance with certain embodiments.

FIG. 1 illustrates a block diagram of a computing environment 100, in which at least one cryptographic key manager server 102 is coupled to at least one storage controller 104, in accordance with certain embodiments. The coupling of the cryptographic key manager server 102 and the storage controller 104 may be over a network 106 or may be via a direct connection. Other cryptographic key manager servers 108 may be coupled to the storage controller 104 over the network 106 or via a direct connection.

The cryptographic key manager servers 102, 108 and the storage controller 104 may comprise any suitable computational platform, including those presently known in the art, such as, a server, a personal computer, a workstation, a mainframe, a midrange computer, a network appliance, a palm top computer, a telephony device, a blade computer, a hand held computer, etc.

The storage controller 104 includes a storage controller application 110 that is implemented in software, firmware, hardware or any combination thereof. The storage controller application 110 controls at least one storage device 112 coupled to the storage controller 104, wherein data 114 may be stored in the storage device 112. For security, the data 114 stored in the storage device 112 may be encrypted data.

The cryptographic key manager server 102, also referred to as a server or a primary cryptographic key manager server, includes data structures that store a cryptographic key 116 and a cryptographic key label 118 that is referred to as a server stored cryptographic key label 118. The cryptographic key manager server 102 also includes a cryptographic key label validator application 120 that is implemented in software, firmware, hardware or any combination thereof.

Prior to performing cryptographic operations, such as encryption or decryption, on the data 114, the storage controller application 110 may request a user 122 to provide a cryptographic key label 124 that is referred to as a user provided cryptographic key label 124. On receiving the user provided cryptographic key label 124 the storage controller application 110 requests the primary cryptographic key manager server 102 to determine the validity of the user provided cryptographic key label 124. In certain embodiments, the cryptographic key label 124 may be a password or a token provided by the user 122. The cryptographic key label validator application 120 compares the user provided cryptographic key label 124 to the server stored cryptographic key label 118 to determine the validity of the user provided cryptographic key label 124. If the user provided cryptographic key label 124 is determined to be valid, then the storage controller application 110 may use the cryptographic key 116 to perform cryptographic operations of the data 114.

In certain embodiments, if the primary cryptographic key manager server 102 is not operational, the storage controller 104 attempts to validate the user provided cryptographic key label 124 via an alternate cryptographic key manager server, such as one of the cryptographic key manager servers 108, wherein the alternate cryptographic key manager server that is also referred to as a secondary cryptographic key manager server may also maintain the cryptographic key 116, the server stored cryptographic key label 118, and the cryptographic key label validator application 120.

Figure 2:
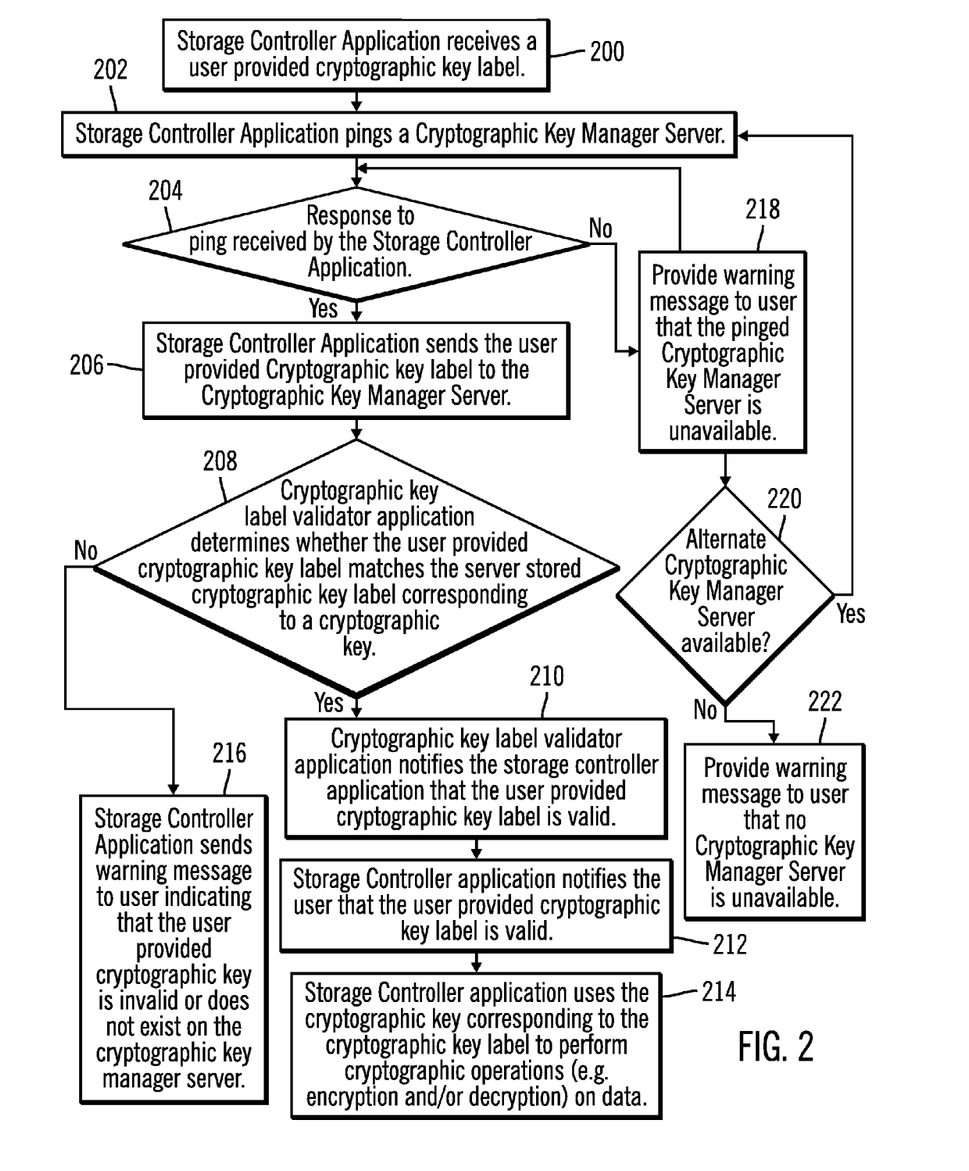
FIG. 2 illustrates first operations for validating a label corresponding to a cryptographic key, in accordance with certain embodiments.

FIG. 2 illustrates first operations that include validating a label corresponding to a cryptographic key, in accordance with certain embodiments. The operations of FIG. 2 may be implemented in the computing environment 100.

Control starts at block 200 in which the storage controller application 110 receives a user provided cryptographic key label 124 from a user 122. In alternative embodiments, the user provided cryptographic key label 124 may be provided by an automated program. The storage controller application 110 pings (at block 202) the cryptographic key manager server 102, wherein a ping is a Transmission Control Protocol/Internet Protocol (TCP/IP) operation for determining whether a node is responsive within a network.

Control proceeds to block 204 where the storage controller application 110 determines whether a response to the ping operation has been received by the storage controller application 110. If so, the cryptographic key manager server 102 is responsive within the network 106 and the storage controller application 110 sends (at block 206) the user provided cryptographic key label 124 to the cryptographic key manager server 102.

The cryptographic key label validator application 120 determines (at block 208) whether the user provided cryptographic key label 124 matches the server stored cryptographic key label 118 corresponding to the cryptographic key 116. If so, the cryptographic key label validator application 120 notifies (at block 210) the storage controller application 110 that the user provided cryptographic key label 124 is valid. The storage controller application 110 then notifies (at block 212) the user 122 that the user provided cryptographic key label 122 is valid, and the storage controller application 110 uses the cryptographic key 116 corresponding to the cryptographic key label to perform (at block 214) cryptographic operations (e.g. encryption and/or decryption) on the data 114 stored in the storage device 112.

If at block 208, the cryptographic key label validator application 120 determines that the user provided cryptographic key label 124 does not match the server stored cryptographic key label 118 corresponding to the cryptographic key 116, then the user provided cryptographic key label 124 may not be used to perform operations with the cryptographic key 116, and the storage controller application 110 sends (at block 216) a warning message to the user 122 indicating that the user provided cryptographic key label 124 is invalid or does not exist on the cryptographic key manager server 100.

If at block 204, no response to the ping operation is received by the storage controller application 110, then the storage controller application 110 provides (at block 218) a warning message to the user 122 that the pinged cryptographic key manager server 102 is unavailable. The storage controller 104 determines (at block 220) whether an alternate cryptographic key manager server 108 that can substitute the primary cryptographic key manager server is 102 may be available. If so, control proceeds to block 202 where the alternate cryptographic key manager server 108 is pinged by the store controller application 110.

If at block 220, it is determined that no alternate cryptographic key manager server is available, control proceeds to block 222 where the storage controller application 110 provides a warning message to the user 122 that no cryptographic key manager server is unavailable.

Therefore, FIG. 2 illustrates certain embodiments in which cryptographic operations on the data 114 are performed if the user provided cryptographic key label 124 matches a server stored cryptographic key label 118. Additionally, if a primary cryptographic key manager server 102 is unavailable, then an alternate cryptographic key manager server 108 is used to validate the user provided cryptographic key 124 prior to performing cryptographic operations on the data 114.

Figure 3:
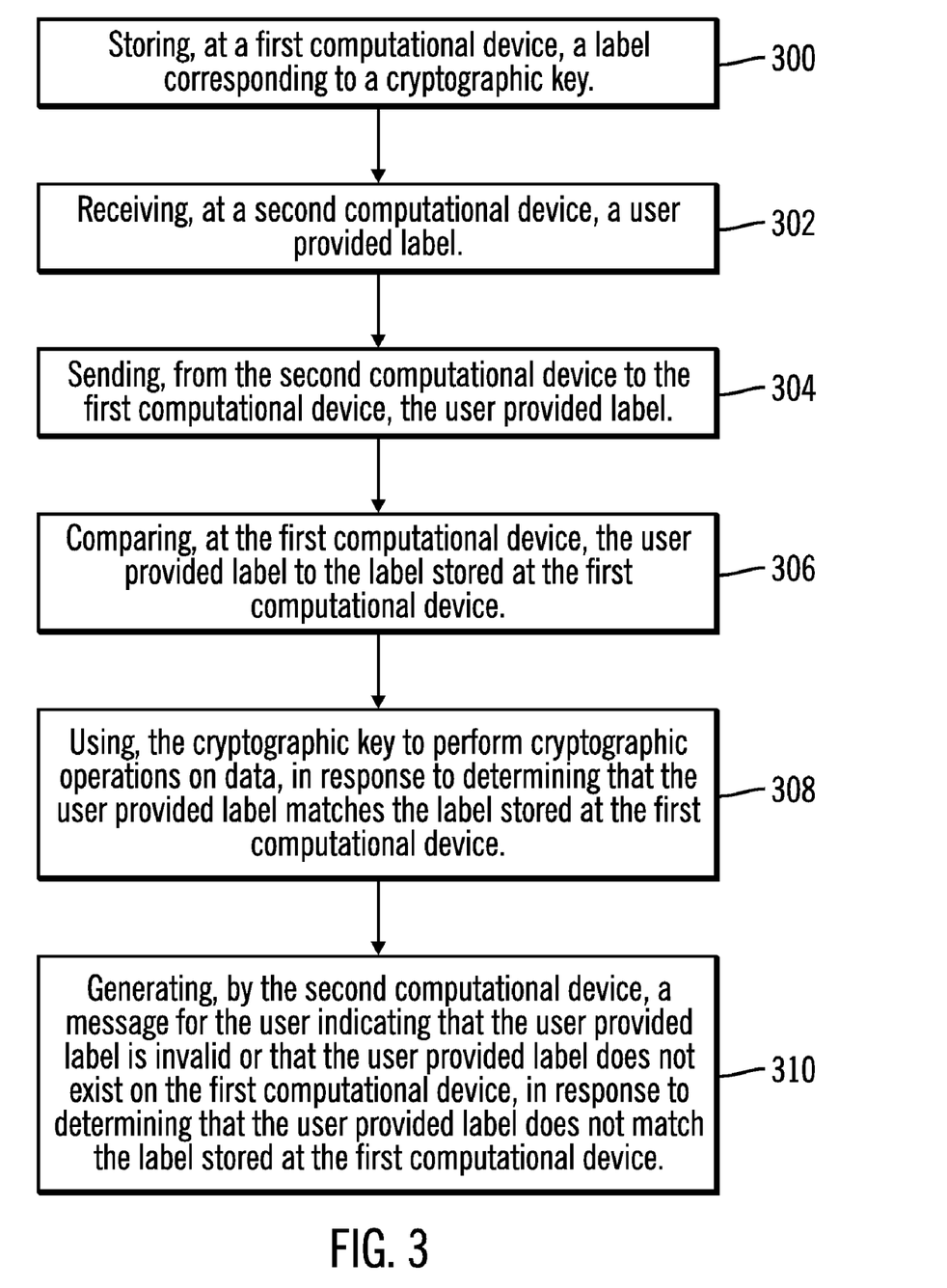
FIG. 3 illustrates second operations for validating a label corresponding to a cryptographic key, in accordance with certain embodiments.

FIG. 3 illustrates second operations for validating a label corresponding to a cryptographic key, in accordance with certain embodiments. The operations shown in FIG. 3 are performed in the computing environment 100.

Control starts at block 300, wherein a first computational device 102, such as the primary cryptographic key manager 102, stores a label 118, such as the server stored cryptographic key label 118, corresponding to a cryptographic key 116.

A second computational device 104, such as the storage controller 104, receives (at block 302) a user provided label 124, such as the user provided cryptographic key label 124. The second computational device 104 sends (at block 304) the user provided label 124 to the first computational device 102.

At the first computational device 102, the user provided label 124 is compared (at block 306) to the label 118 stored at the first computational device 102. The cryptographic key 116 is used (at block 306) to perform cryptographic operations on the data 114, in response to determining that the user provided label 124 matches the label 118 stored at the first computational device 102.

Control proceeds to block 308, wherein the second computational device 104 generates a message for the user 122 indicating that the user provided label 124 is invalid or that the user provided label 124 does not exist on the first computational device 102, in response to determining that the user provided label 124 does not match the label 118 stored at the first computational device 102.

In many situations, a customer may have to rely on experience to correctly setup the connectivity of the cryptographic key manager server and the storage controller. In certain situations, certain events may cause a cryptographic network to be setup incorrectly. A customer may be informed of the failure of activities that require access to the cryptographic key manager server. Certain embodiments add a safety check that can inform a customer of setup problems in at least two aspects of the setup: (a) the cryptographic key label setup; and (b) the connectivity of the storage controller and the cryptographic key manager server.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 4:
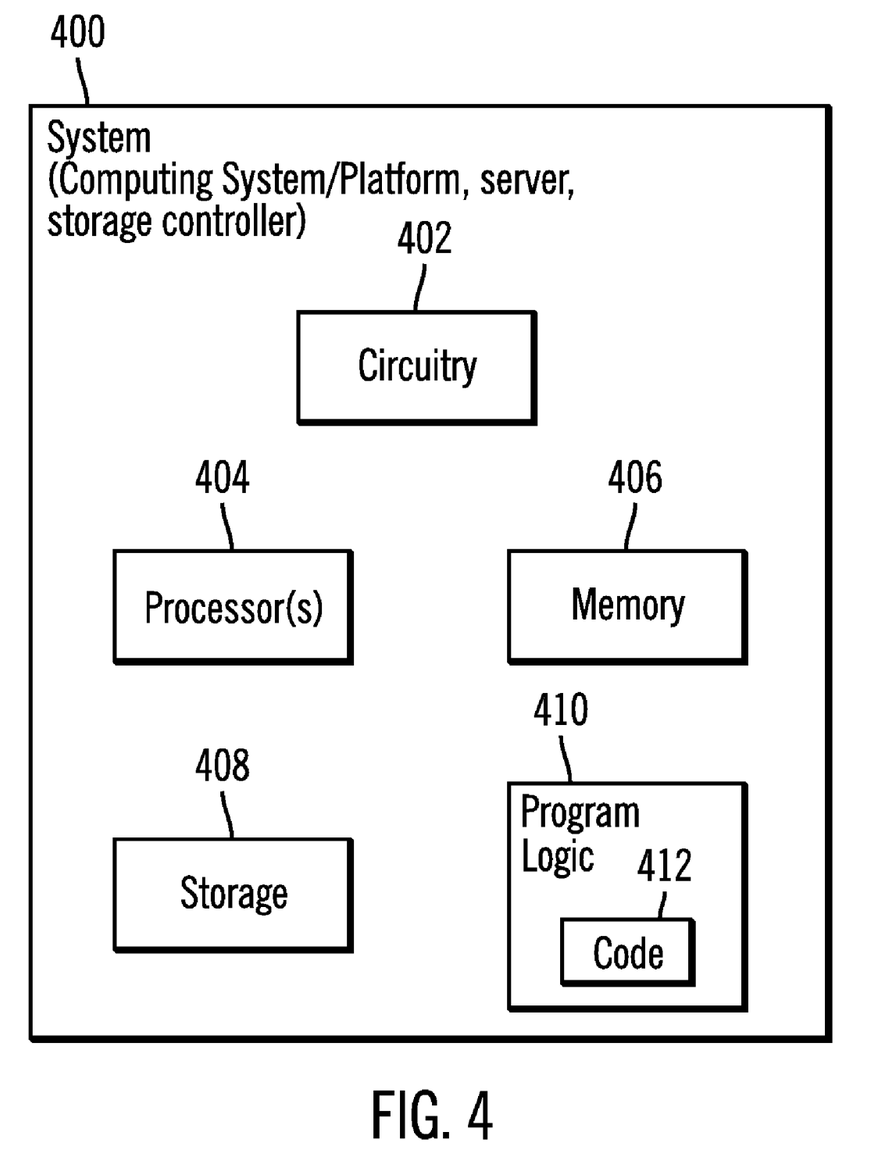
FIG. 4 illustrates a block diagram that shows certain elements that may be included in the cryptographic key manager server and the storage controller of the computing environment of FIG. 1, in accordance with certain embodiments.

FIG. 4 illustrates a block diagram that shows certain elements that may be included in the servers 102, 108 and storage controller 104 in accordance with certain embodiments. One or more of the servers 102, 108 and storage controller 104 either individually or collectively may also be referred to as a system 400, and may include a circuitry 402 that may in certain embodiments include a processor 404. The system 400 may also include a memory 406 (e.g., a volatile memory device), and storage 408. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method comprising,
storing, at a primary cryptographic key manager server, a cryptographic key and a password corresponding to the cryptographic key;
storing at an alternate cryptographic key manager server, both the cryptographic key and the password stored in the primary cryptographic manager server;
receiving, at a storage controller, a user provided password;
sending a ping command from the storage controller to the primary cryptographic key manager server, in response to receiving the user provided password at the storage controller;
generating, by the storage controller, a message for the user indicating that the primary cryptographic key manager is unavailable, in response to receiving no response to the ping command from the cryptographic key manager server;
sending another ping command to the alternate cryptographic key manager server, in response to receiving no response to the ping command from the primary cryptographic key manager server;
using the alternate cryptographic key manager server to compare the user provided password to the password stored at the alternate cryptographic key manager server, in response to receiving a response to the another ping command from the alternate cryptographic key manager server; and
using the cryptographic key stored at the alternate cryptographic key manager server to perform cryptographic operations on data stored in a storage device coupled to the storage controller, in response to determining that the user provided password matches the password stored at the alternate cryptographic key manager server.

2. The method of claim 1, wherein a setup of an encryption product comprising the primary cryptographic key manager server, the alternate cryptographic key manager server, the storage controller, and the storage device, is verified prior to any user initiated Input/Output (I/O) using the cryptographic key being started.

3. The method of claim 2, wherein the setup of the encryption product prior to any user initiated I/O is verified by at least using:
the password; and
the ping command and the another ping command.

4. The method of claim 3, the method further comprising:
informing the user of an incorrect setup of the encryption product.

5. The method of claim 4, wherein a password validator application is maintained on both the primary cryptographic key manager server and the alternate cryptographic key manager server, and wherein the password validator application compares the user provided password to the password corresponding to the cryptographic key.

6. A storage controller coupled to a primary cryptographic key manager server that stores a cryptographic key and a password corresponding to the cryptographic key and an alternate cryptographic key manager server that stores both the cryptographic key and the password stored in the primary cryptographic manager serve, the storage controller comprising:
a memory;
a processor coupled to the memory, wherein the processor performs operations, the operations comprising:
receiving a user provided password;

sending a ping command from the storage controller to the primary cryptographic key manager server, in response to receiving the user provided password at the storage controller;

generating, by the storage controller, a message for the user indicating that the primary cryptographic key manager is unavailable, in response to receiving no response to the ping command from the cryptographic key manager server;

sending another ping command to the alternate cryptographic key manager server, in response to receiving no response to the ping command from the primary cryptographic key manager server;

using the alternate cryptographic key manager server to compare the user provided password to the password stored at the alternate cryptographic key manager server, in response to receiving a response to the another ping command from the alternate cryptographic key manager server; and using the cryptographic key stored at the alternate cryptographic key manager server to perform cryptographic operations on data stored in a storage device coupled to the storage controller, in response to determining that the user provided password matches the password stored at the alternate cryptographic key manager server.

7. The system of claim 6, wherein a setup of an encryption product comprising the primary cryptographic key manager server, the alternate cryptographic key manager server, the storage controller, and the storage device, is verified prior to any user initiated Input/Output (I/O) using the cryptographic key being started.

8. The system of claim 7, wherein the setup of the encryption product prior to any user initiated I/O is verified by at least using:
the password; and
the ping command and the another ping command.

9. The system of claim 8, the operations further comprising:
informing the user of an incorrect setup of the encryption product.

10. The system of claim 9, wherein a password validator application is maintained on both the primary cryptographic key manager server and the alternate cryptographic key manager server, and wherein the password validator application compares the user provided password to the password corresponding to the cryptographic key.

11. A non-transitory computer readable storage medium, wherein code stored in the non-transitory computer readable storage medium when executed by one or more processors performs operations, the operations comprising:
storing, at a primary cryptographic key manager server, a cryptographic key and a password corresponding to the cryptographic key;
storing at an alternate cryptographic key manager server, both the cryptographic key and the password stored in the primary cryptographic manager server;
receiving, at a storage controller, a user provided password;
sending a ping command from the storage controller to the primary cryptographic key manager server, in response to receiving the user provided password at the storage controller;
generating, by the storage controller, a message for the user indicating that the primary cryptographic key manager is unavailable, in response to receiving no response to the ping command from the cryptographic key manager server;
sending another ping command to the alternate cryptographic key manager server, in response to receiving no response to the ping command from the primary cryptographic key manager server;
using the alternate cryptographic key manager server to compare the user provided password to the password stored at the alternate cryptographic key manager server, in response to receiving a response to the another ping command from the alternate cryptographic key manager server; and
using the cryptographic key stored at the alternate cryptographic key manager server to perform cryptographic operations on data stored in a storage device coupled to the storage controller, in response to determining that the user provided password matches the password stored at the alternate cryptographic key manager server.

12. The non-transitory computer readable storage medium of claim 11, wherein a setup of an encryption product comprising the primary cryptographic key manager server, the alternate cryptographic key manager server, the storage controller, and the storage device, is verified prior to any user initiated Input/Output (I/O) using the cryptographic key being started.

13. The non-transitory computer readable storage medium of claim 12, wherein the setup of the encryption product prior to any user initiated I/O is verified by at least using:
the password; and
the ping command and the another ping command.

14. The non-transitory computer readable storage medium of claim 13, the operations further comprising:
informing the user of an incorrect setup of the encryption product.

15. The non-transitory computer readable storage medium of claim 14, wherein a password validator application is maintained on both the primary cryptographic key manager server and the alternate cryptographic key manager server, and wherein the password validator application compares the user provided password to the password corresponding to the cryptographic key.

16. A method for deploying computing infrastructure, comprising integrating machine-readable code into a primary cryptographic key manger server, an alternate cryptographic key manager server, and a storage controller, wherein the code in combination with the primary cryptographic key manger server, the alternate cryptographic key manager server, and the storage controller is capable of performing:
storing, at the primary cryptographic key manager server, a cryptographic key and a password corresponding to the cryptographic key;
storing at the alternate cryptographic key manager server, both the cryptographic key and the password stored in the primary cryptographic manager server;
receiving, at the storage controller, a user provided password;
sending a ping command from the storage controller to the primary cryptographic key manager server, in response to receiving the user provided password at the storage controller;
generating, by the storage controller, a message for the user indicating that the primary cryptographic key manager is unavailable, in response to receiving no response to the ping command from the cryptographic key manager server;
sending another ping command to the alternate cryptographic key manager server, in response to receiving no response to the ping command from the primary cryptographic key manager server;

using the alternate cryptographic key manager server to compare the user provided password to the password stored at the alternate cryptographic key manager server, in response to receiving a response to the another ping command from the alternate cryptographic key manager server; and using the cryptographic key stored at the alternate cryptographic key manager server to perform cryptographic operations on data stored in a storage device coupled to the storage controller, in response to determining that the user provided password matches the password stored at the alternate cryptographic key manager server.

17. The method for deploying computing infrastructure of claim 16, wherein a setup of an encryption product comprising the primary cryptographic key manager server, the alternate cryptographic key manager server, the storage controller, and the storage device, is verified prior to any user initiated Input/Output (I/O) using the cryptographic key being started.

18. The method for deploying computing infrastructure of claim 17, wherein the setup of the encryption product prior to any user initiated I/O is verified by at least using:

the password; and the ping command and the another ping command.

19. The method for deploying computing infrastructure of claim 18, the operations further comprising:

informing the user of an incorrect setup of the encryption product.

20. The method for deploying computing infrastructure of claim 19, wherein a password validator application is maintained on both the primary cryptographic key manager server and the alternate cryptographic key manager server, and wherein the password validator application compares the user provided password to the password corresponding to the cryptographic key.

* * * * *